United States Patent
Lando et al.

(10) Patent No.: US 11,412,671 B2
(45) Date of Patent: Aug. 16, 2022

(54) HORTICULTURAL SUBSTRATE CONDITIONER

(71) Applicant: PROFILE PRODUCTS, L.L.C., Buffalo Grove, IL (US)

(72) Inventors: Robert Lando, Avon, OH (US); Joseph Smith, Vermilion, OH (US); George Andulics, Lorain, OH (US)

(73) Assignee: PROFILE PRODUCTS L.L.C., Buffalo Grove, IL (US)

(*) Notice: Subject to any disclaimer, the term of this patent is extended or adjusted under 35 U.S.C. 154(b) by 0 days.

(21) Appl. No.: 15/858,150

(22) Filed: Dec. 29, 2017

(65) Prior Publication Data

US 2019/0200545 A1 Jul. 4, 2019

(51) Int. Cl.
| | |
|---|---|
| *A01G 24/60* | (2018.01) |
| *D01G 7/02* | (2006.01) |
| *D01G 7/04* | (2006.01) |
| *A01G 24/23* | (2018.01) |
| *C09K 17/52* | (2006.01) |
| *A01G 9/02* | (2018.01) |
| *A01G 24/40* | (2018.01) |
| *D01B 1/24* | (2006.01) |

(52) U.S. Cl.
CPC .............. *A01G 24/60* (2018.02); *A01G 9/02* (2013.01); *A01G 24/23* (2018.02); *A01G 24/40* (2018.02); *C09K 17/52* (2013.01); *D01B 1/24* (2013.01); *D01G 7/02* (2013.01); *D01G 7/04* (2013.01)

(58) Field of Classification Search
CPC .......... A01G 13/02; A01G 24/60; D01G 7/04; D01G 9/06; D01G 13/00; D01G 21/00; D01G 7/02

USPC .......... 47/1.01 R, 58.1 SC; 19/98, 100–102; 241/605

See application file for complete search history.

(56) References Cited

U.S. PATENT DOCUMENTS

| | | |
|---|---|---|
| 4,698,878 A | 10/1987 | Bueschgens et al. |
| 4,912,811 A | 4/1990 | Walk |
| 5,211,708 A | 5/1993 | Rentsch et al. |
| 5,515,577 A | 5/1996 | Pinto et al. |
| 5,669,740 A | 9/1997 | Townsend et al. |
| 5,768,750 A | 6/1998 | Williams |

(Continued)

FOREIGN PATENT DOCUMENTS

| | | |
|---|---|---|
| GB | 502729 | 3/1939 |
| GB | 2294953 A | 5/1996 |

OTHER PUBLICATIONS

PCT International Search Report dated Mar. 22, 2019, Application No. PCT/US2018/67640.

*Primary Examiner* — David J Parsley
(74) *Attorney, Agent, or Firm* — Brooks Kushman P.C.

(57) ABSTRACT

A horticultural substrate conditioner includes a housing having an opening to receive a growing medium and an outlet to discharge the growing medium, a shaft arranged within the housing, the shaft rotatable relative to the housing, and a plurality of tines disposed on the shaft spaced apart from each other, the tines comprising a flexible material, wherein upon entry of a growing medium into the housing, the tines are capable of engaging the growing medium such that as the shaft rotates, the growing medium is broken apart and/or reduced in density and size to enable optimal distribution of the growing medium into a container upon discharge from the housing.

19 Claims, 5 Drawing Sheets

(56) References Cited

U.S. PATENT DOCUMENTS

| | | | |
|---|---|---|---|
| 5,988,937 A * | 11/1999 | Komoriya | E02D 3/12 |
| | | | 404/90 |
| 6,539,585 B1 | 4/2003 | Anthony | |
| 8,162,243 B2 * | 4/2012 | Wenthe | B02C 4/286 |
| | | | 241/159 |
| 9,027,863 B2 * | 5/2015 | Wentz | A01F 29/005 |
| | | | 241/189.1 |
| 9,745,672 B2 | 8/2017 | Schmid et al. | |
| 2013/0175376 A1 | 7/2013 | Freakes | |
| 2016/0081278 A1 | 3/2016 | Freakes | |
| 2017/0137972 A1 | 5/2017 | Spittle et al. | |

* cited by examiner

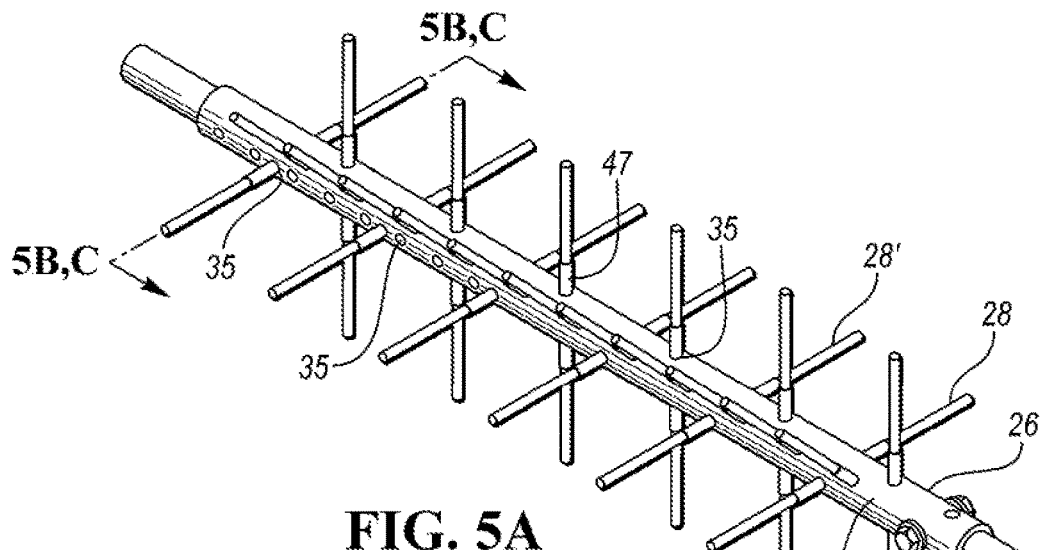
FIG. 5A
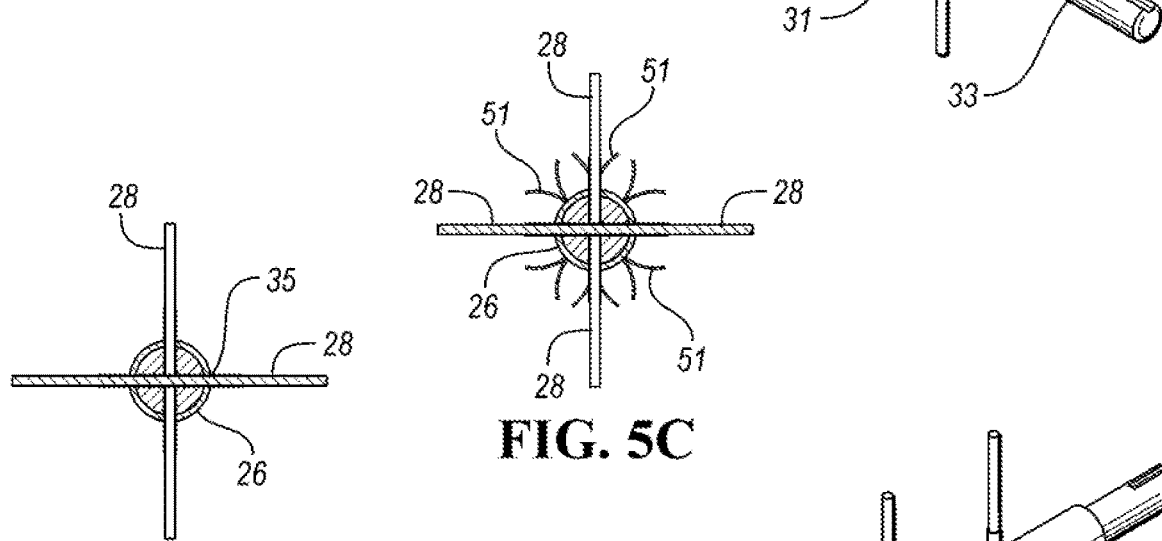
FIG. 5B
FIG. 5C
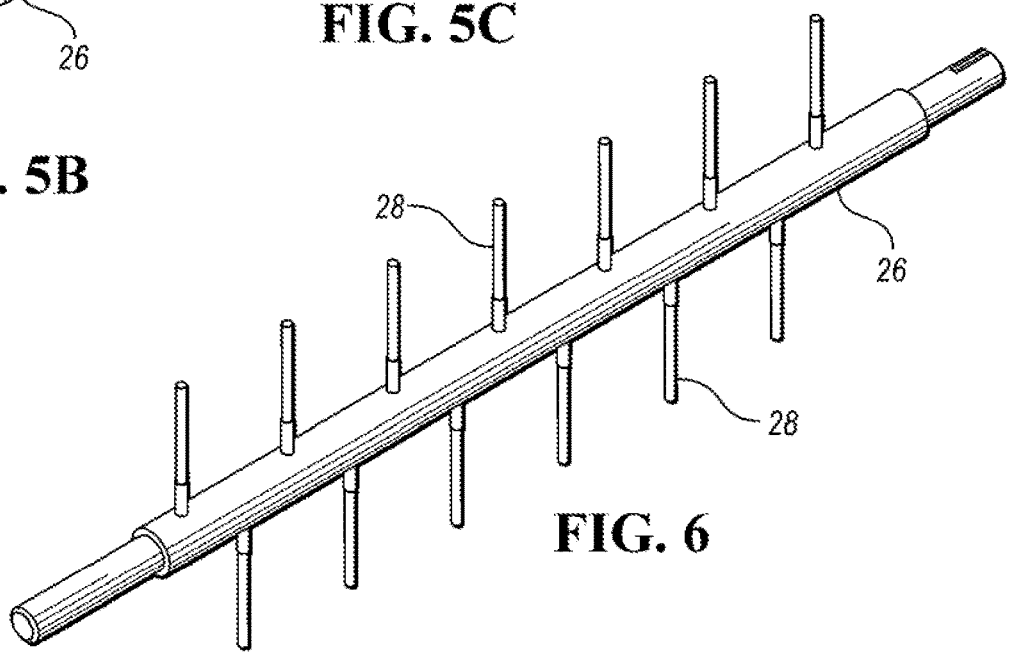
FIG. 6

HORTICULTURAL SUBSTRATE CONDITIONER

TECHNICAL FIELD

The invention is directed to an apparatus adapted to lower the density and/or size of a soilless substrate or another growing medium and/or condition a soilless substrate or another growing medium, and a method of using the same.

BACKGROUND

Growing media, including soilless substrates, are subjected to a variety of processes such as conditioning, which breaks the substrate apart into smaller pieces or clumps. The conditioning assists with cell tray and pot filling. Conditioning the substrate by hand would require extensive time and energy. Thus, various machines have been developed for these purposes. Yet, the typical conditioning machines often require high speed rotation of metal parts, creating a hazardous work environment for an individual operating the machine. Accordingly, there remains a need for a conditioning apparatus that can optimize the size of the soilless substrate pieces while maintaining safe working conditions for a user. Additionally, there is a need for a conditioning apparatus generating a more uniform distribution of the substrate pieces and allowing for a better container and cell tray filling while maintaining safe working conditions for a user.

SUMMARY

A horticultural substrate conditioner is disclosed. The conditioner may include a housing having an opening to receive a growing medium and an outlet to discharge the growing medium. The conditioner may include a shaft arranged within the housing. The shaft may be rotatable relative to the housing. The conditioner may further include a plurality of tines disposed on the shaft spaced apart from each other. The tines may include a flexible material. Upon entry of a growing medium into the housing, the tines may be capable of engaging the growing medium such that as the shaft rotates, the growing medium is broken apart and/or reduced in density and size to enable optimal distribution of the growing medium into a container upon discharge from the housing. The conditioner may further include a motor for rotating the shaft. The shaft may include a lightweight material such as polyvinyl chloride (PVC). The flexible material may be a plastic wire or string. The conditioner may further include a mounting bracket for attaching the horticultural substrate conditioner onto a growing medium filler or hopper. At least one dimension of the housing may be adjustable. The shaft may be adjustable. The tines may be spaced between about 1.25 cm and 2.5 cm apart from each other.

In an alternative embodiment, a substrate conditioner is disclosed. The conditioner includes a housing and a shaft arranged within the housing. The conditioner further includes a plurality of tines disposed on the shaft. Each of the plurality of tines may have dimensions of about 0.25 cm to 0.5 cm by about 20 cm to 25 cm. Each of the plurality of tines may be spaced apart by about 1.25 cm to 2.5 cm. The shaft may have a diameter of about 2.5 cm. A length of the shaft may be adjustable. The tines may be malleable. The shaft may include perforations capable of housing the tines. Each of the tines may include an anti-slip portion adjacent to the shaft. The conditioner may include at least one additional shaft with tines.

In a yet another embodiment, a method of conditioning a fibrous growing medium to optimize filling conditions in a container is disclosed. The method may include supplying a fibrous growing medium having a first density and first size to a substrate conditioner including a plurality of flexible projections disposed upon a rotatable shaft. The method may further include engaging the fibrous growing medium with at least some of the plurality of flexible projections. The method may further include breaking apart the fibrous growing medium by rotating the shaft, thereby lowering the first density and first size of the fibrous growing medium to create a conditioned growing medium having a second density and second size lower than the first density and first size. The method may further include discharging the conditioned growing medium into a container disposed adjacent to the soil feeder substrate conditioner. The first density may be about 10% higher than the second density. The first size may be about 10 cm wide and 15 cm long. The second size may be about 2.5 cm wide and 4 cm long. The container is a tapered horticultural container.

BRIEF DESCRIPTION OF THE DRAWINGS

FIG. 5A shows a perspective view of an example shaft with tines according to one or more embodiments;

FIGS. 5B and 5C show cross-sectional views of the shaft depicted in FIG. 5A;

FIG. 6 shows an alternative example of an example shaft with tines;

DETAILED DESCRIPTION

Figure 1A:
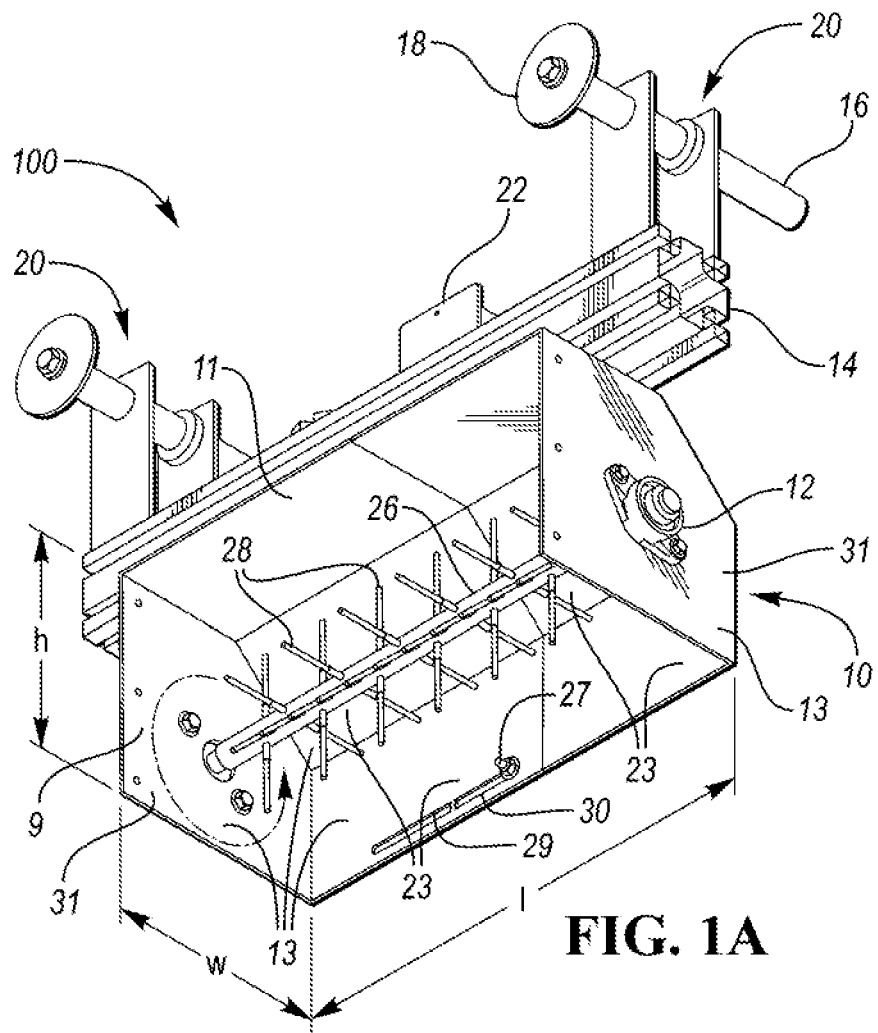
FIGS. 1A and 1B depict perspective views of example horticultural substrate conditioners according to one or more embodiments.

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "growing medium" refers to a substrate, specifically a generally soil-free substrate or a soilless substrate or a combination of materials used to provide physical support, water retention, aeration, and/or nutrient supply for plant growth so that a plant can establish its root system within the growing medium and allow for root growth, as the roots grow in spaces between individual particles of the growing medium.

The growing medium may include one or more wood components. The term "wood components" or "fibrous wood components" refers to wood chips, wood fiber, bark, needles, or their combination. The wood components may be derived from coniferous and deciduous trees and may be prepared by any convenient manner, for example as disclosed for wood fibers in U.S. Pat. No. 2,757,150. Any type of wood components may be used, but wood components of the softwood varieties such as yellow poplar, cedar such as Western red cedar, fir such as Douglas fir, California redwood, and particularly pine such as Ponderosa, Sugar, White, and Yellow varieties of pine are preferred. For example, fibrous wood components may refer to fibrous pine tree wood components including just fibrous pine tree wood or fibrous pine tree wood as well as fibrous tree bark, needles, chips, or a combination thereof.

An example growing medium may include about 5 to about 95 weight % of tree bark mixed with about 95 to about 5 weight % of wood components, based on the total weight of the growing medium. The growing medium may include 100 weight % fibrous pine wood components. The growing medium may include about 10 weight % of tree bark and about 90 weight % of wood components, based on the total weight of the growing medium. The growing medium may include about 20 to about 70 weight % of tree bark and about 30 to about 80 weight % of wood components, based on the total weight of the growing medium. Alternatively, the growing medium may include about 50 to about 60 weight % of tree bark and about 40 to about 50 weight % of wood components, based on the total weight of the growing medium. The growing medium may include about 90 weight % of tree bark and about 10 weight % of wood components, based on the total weight of the growing medium.

The growing medium may contain at least a portion of peat, coir, rice hulls, compost. Other growing media and mulches are contemplated. For example, the soilless substrate may further contain a portion of fertilizer(s), macronutrient(s), micronutrient(s), mineral(s), binder(s), natural gum(s), interlocking manmade fiber(s), and the like, and combinations thereof. The growing medium may contain a portion of soil. The portion may be 0.5, 1, 1.5, 2, 2.5, 3, 5, 10, 15, 20, 25, 30, 45, 50, 55, 60, 65, 70, 75, 80, 85, 90, 95, or more weight %.

Throughout the entire disclosure, unless otherwise specified, all weight percentages of components are based on the total weight percent of the components in the growing medium which is 100% by weight. In addition, unless otherwise specified, all volume percentages of components are based on the total volume percent of the components in the growing medium which is 100% by volume.

The growing medium may be distributed into horticultural cell trays or pots. Yet, an unconditioned growing medium may contain pieces, chunks, or clumps having dimensions which do not easily fill cell trays, pots, and/or other containers. The cells may be tapered towards the bottom. The cells and/or containers may have a top and/or bottom having a cross-section which is square, rectangular, round, regular, irregular, symmetrical, asymmetrical, or the like. The cells and/or containers may have the same or different cross-section. Specifically, long, narrow, and/or deep cells may be especially hard to fill with the growing medium. Example dimensions of such cells may be about ¼, ½, ⅓, 1, 2, 3, 4, 5, or more inches wide at the top, about ⅛, ¼, ½, ⅓, ⅜, or more wide at the bottom, and/or have a height of about 1, 1.5, 2, 2.5, 3, 3.5, or more inches. An example cell may have the following dimensions: about ½ inch (1.27 cm) wide square-shaped opening at the top, narrowing down to about ⅜ inch (0.95 cm) square-shaped base at the bottom such that the cell is tapered, and a height of about 2.5 inches (6.35 cm). A cell that is only partially filled with substrate may provide inadequate growing conditions such that a plant to be grown in the container may not develop an adequate root system to optimize growth.

Thus, the growing medium may be conditioned to reduce the substrate into smaller pieces, chunks, clusters, and/or clumps as the growing medium exits a hopper, approaches a container filler, or both. A container may be a pot, tray, cell, vessel, bucket, planter, can, crate, or any other horticultural container to be filled with the growing medium. The container may be further subdivided into smaller planting units. As was mentioned above, conditioning a growing medium by hand is not economical. And the existing conditioning devices typically utilize exposed metal portions which may pose safety hazard to a user. Additionally, a more uniform distribution of growing medium pieces or clumps is desirable to optimize the container filling.

Additionally still, it is desirable to provide a substrate conditioner which is widely affordable. With the rising prices associated with non-renewable materials, it is also desirable to design a growing medium conditioner which would be economical and have at least some parts made from renewable resources.

A horticultural substrate conditioner 100, an example of which is disclosed in FIG. 1, resolves one or more problems listed above. The horticultural substrate conditioner 100 may be used to condition a growing medium to reduce the size of the growing medium pieces and clumps to allow for better fill of containers, especially deep, narrow cells in trays used for propagation. The conditioner 100 may be used, for example, as the growing medium exits a hopper after being expanded and/or otherwise processed.

Furthermore, the horticultural substrate conditioner 100 may further decrease the density of a growing medium by about 10% compared to the density of the growing medium entering the conditioner 100.

Optimally conditioning the growing medium may result in optimal increase of moisture penetration, which in turn supports greater water uptake by plants in comparison to a compressed, insufficiently, or ineffectively conditioned growing medium. Thus, conditioning a growing medium in the conditioner 100 may produce ideal growing conditions for plants that perform suboptimally in compressed soil.

The example horticultural substrate conditioner 100 includes a housing 10 with a rotatable shaft 26 within. The shaft 26 has a plurality of tines 28 disposed thereon. The shaft 26 may be connected to the housing 10 by at least one fastener 12. The shaft 26 and the housing 10 may each be adjustable in at least one dimension. The housing 10 may be provided with a rail 30 to enable sliding movement for adjusting a width of the housing 10. The horticultural substrate conditioner 100 may also include a beam 14 to which the housing 10 may be attached. The beam 14 may support an apparatus 20 enabling attachment of the conditioner 100 to another machine, soil filler, hopper, conveyor belt, or the like. As is depicted in FIG. 1, a beam 14 may support more than one apparatus 20.

The housing 10 may be any frame, body, cover, or shell formed of a top panel 11 and at least one side wall or panel 13 defining a space within the housing, a housing cavity 9. The example housing 10 depicted in FIG. 1 has at least four panels 13 defining the space within the housing 10. The number of panels 13 may differ, depending on the needs of a specific application. For example, the housing 10 may have 1, 2, 3, 4, 5, 6, 7, 8, 9, 10, or more panels 13. Each panel 13 may include one or more portions. At least one side of the housing 10 contains no material such that the housing 10 may input and/or output material. For example, the housing 10 may include no panel forming the rear side and no panel forming the bottom side. In other words, the rear and bottom sides of the housing 10 are formed by an open space, aperture, cavity, or empty space.

Figure 1B:
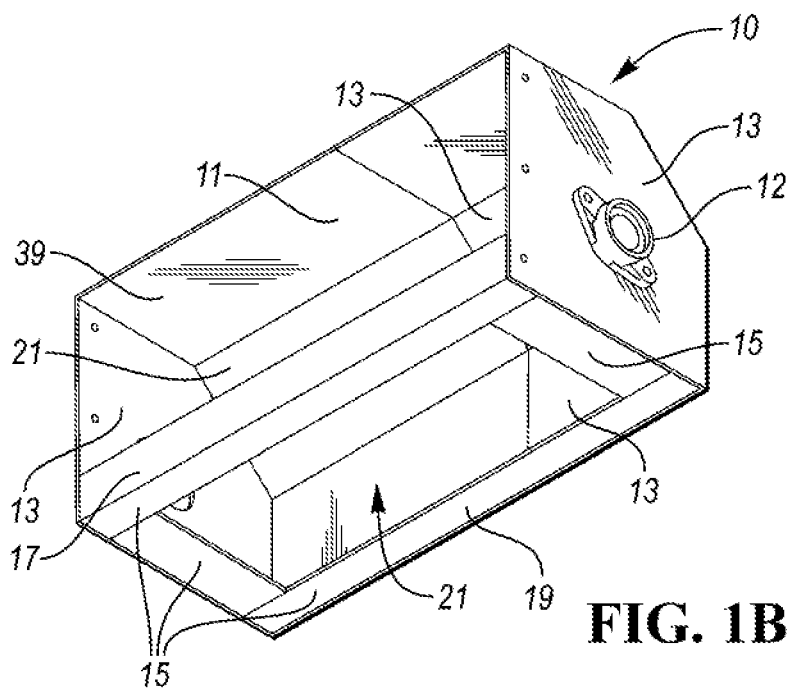
Figure 2:
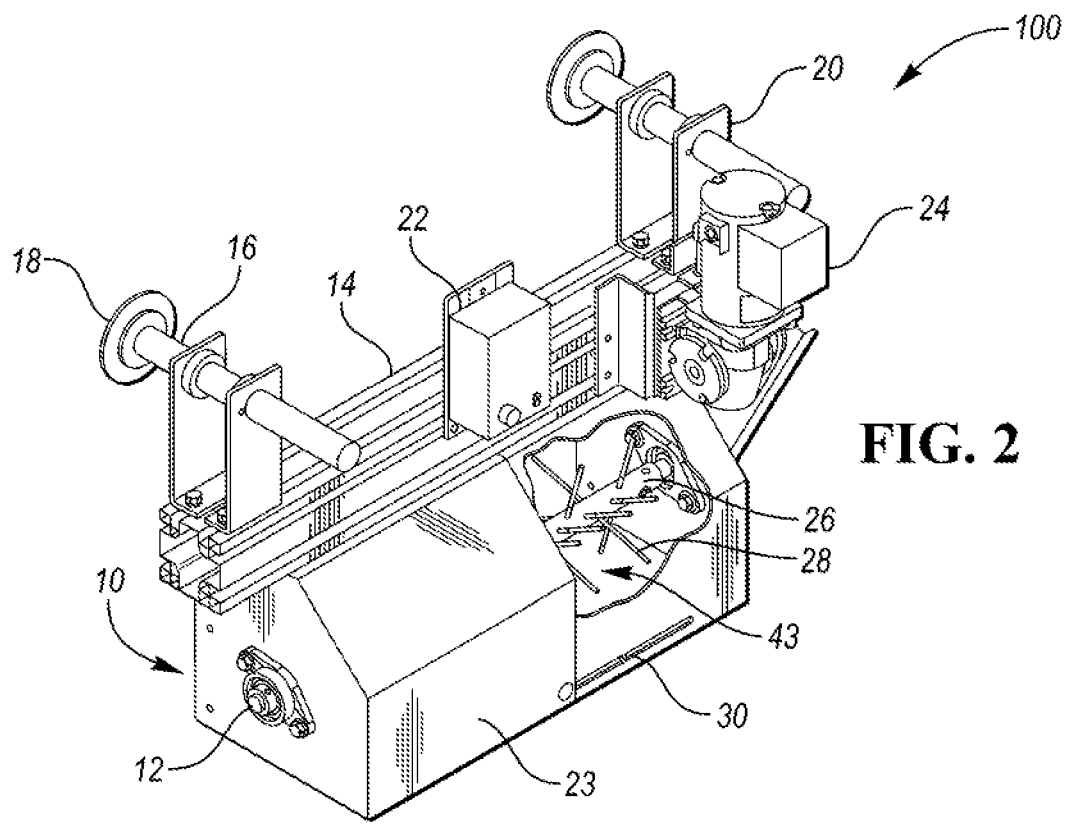
FIG. 2 shows a perspective view of the front and right side of the conditioner depicted in FIG. 1.
Figure 3:
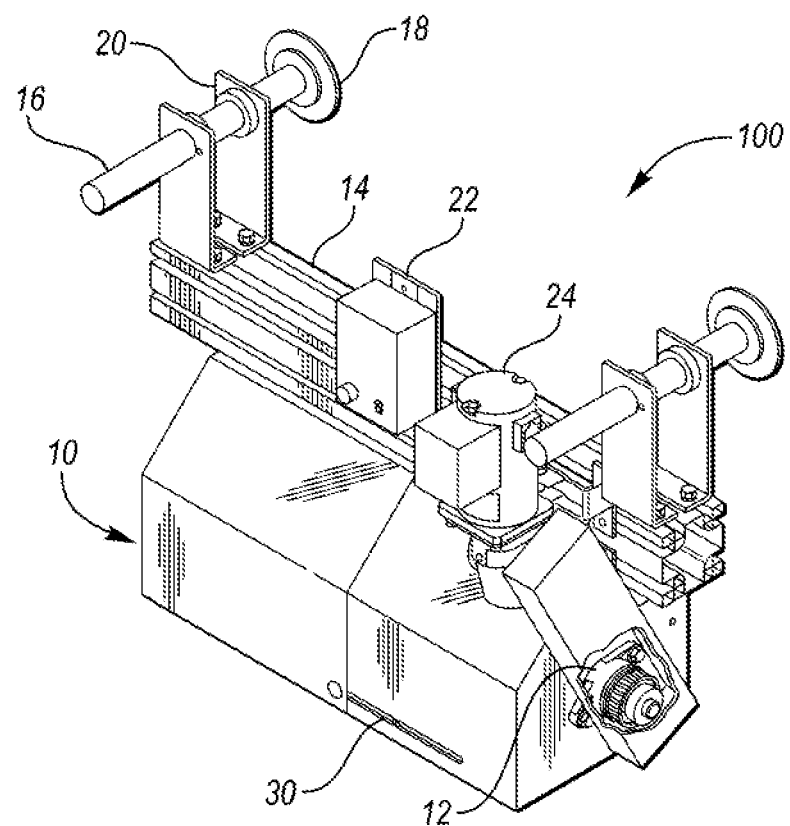
FIG. 3 shows an alternative perspective side and front view of the conditioner depicted in FIG. 1.

In an alternative embodiment, depicted in FIG. 1B, the housing 10 includes an additional material 15 defining the rear panel 17 and the bottom panel 19. The rear panel 17 and the bottom panel 19 thus may include portions formed from any material named above and an aperture 21 which allows the growing medium to enter and exit the housing 10 via the inlet 39 and the outlet 41.

The housing 10 may include various materials including, but not limited to, metal, plastic, ceramic, glass, wood, fiber, textile, composite, the like, or a combination thereof. The housing 10 may have a range of cross-sectional shapes, for example, rectangular, square, symmetrical, asymmetrical, regular, irregular. The cross-sectional shape may also be a pentagon, as seen in FIG. 1, hexagon, heptagon, octagon, or the like. The three-dimensional shape of the housing 10 could be a cube, cylinder, triangular prism, pentagonal prism, or another shape, with at least one side open to access the space within or housing cavity 9 such that the growing medium fiber can accumulate and/or pass through the housing cavity 9 as it is being broken down within the housing 10.

Sizing of the housing 10 varies, depending on a specific application. In one embodiments, at least one dimension of the housing 10 is adjustable. The adjustable dimensions may be length l, height h, width w, or a combination thereof. The adjustability allows a user to accommodate a supply of the growing medium of different sizes, and thus utilize one piece of equipment, the conditioner 100, to condition a variety of products.

For example, in at least one embodiment, the length l of the housing 10 may be adjustable. Adjustability of the housing 10 may be provided by arranging two or more panels 13 and/or their portions, for example panels 23 forming a front side of the housing 10, to overlap and/or slide against each other. The housing 10 may be further provided with a rail/slot 30 enabling sliding movement of the panels 13. The rail 30 could alternatively be a track, a groove, or another mechanism enabling sliding movement.

Figure 4:
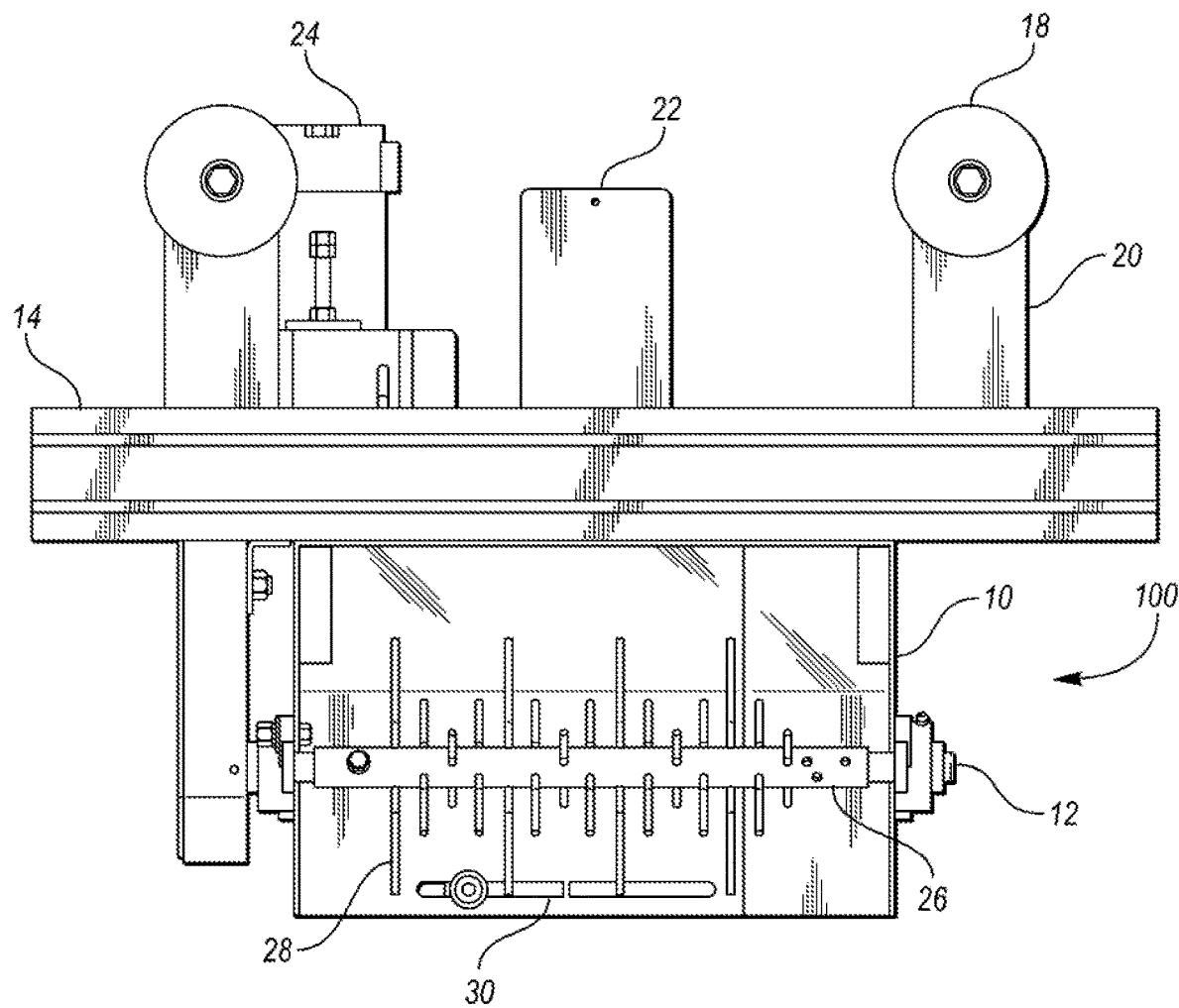
FIG. 4 shows a rear view of the conditioner depicted in FIG. 1.

As can be seen in FIGS. 1 and 4, the rail 30 may be a pin, bolt, nut, screw, or fastener 27 associated with an elongate aperture 29. A similar mechanism including a rail and fastener may be included to adjust at least one additional dimension of the housing 10.

Additionally, by sliding the panel 23 over another panel 13, partially, or completely, an opening 43 is formed. The opening 43 may serve for inputting of additional components to the growing medium being conditioned. Examples of the additional components include, but are not limited to, fertilizer(s), macronutrient(s), micronutrient(s), mineral(s), binder(s), natural gum(s), interlocking manmade fiber(s), and the like, and combinations thereof.

The housing cavity 9 includes at least one rotatable shaft 26 arranged within the housing 10 and fastened to at least one side panel 31 of the housing 10. The rotatable shaft 26 may be a bar, rod, pole, dowel, or another elongate member. The shaft 26 may be made from various materials named above. For example, the shaft 26 may be made from thermoset, thermoplastic. The shaft 26 may be made from polyvinyl chloride (PVC), polyethylene (PE), polypropylene (PP), polyurethane (PU), polyamide (PA), or the like.

The shaft 26 may be hollow to include an internal cavity. The shaft may include a plurality of apertures 35 to accommodate a plurality of tines 28. Not all apertures 35 may include a tine 28 such that a number of apertures 28 may remain vacant, as is depicted in FIG. 5. At least some of the apertures may be designed to assist with adjustment of the length of the shaft 26, for example by providing a space into which a peg, bolt, nut, or another fastener may be inserted such that an inner shall member 33 may be secured within the outer shaft member 31, as will be further described.

The shaft 26 may be affixed to the housing 10 at each end by a fastener 12. Any fastener 12 capable of securing the shaft 26 to the housing 10 while enabling rotating movement of the shaft 26 may be used. For example, the fastener 12 may include a bearing, bolt, screw, latch, button, clasp, rivet, snap, adhesive, or a combination thereof. The shaft 26 may further include a stub shaft on each end, proximal to the fastener 12, to allow rotation of the shaft 26.

At least one dimension of the shaft 26 may be adjustable. For example, length $l_S$ of the shaft 26 may be adjustable. The adjustability may be a one-time adjustability, for example by removing excess material at one or both ends of the shaft 26 to fit the shaft 26 to a desirable dimension of the housing 10. Alternatively, the shaft 26 may be adjusted and remain adjustable. This may be achieved for example by providing a shaft including two separate portions 31 and 33, as is depicted in FIG. 5. The portion 33, an inner shaft member, may be arranged within a cavity of portion 31, an outer shaft member, such that the total length of both portions may be changed according to the needs of a specific application and internal dimensions of the housing and the housing cavity 9.

The diameter of the shaft 26, the outer shaft member 31, or the inner shaft member 33 may be about 0.5, 1, 1.5, 2, 2.5, 3, 3.5, 4, 4.5, 5, 5.5, 6 cm or more.

The shaft 26 is rotatable. The shaft 26 is capable of rotating at a speed sufficient to condition a growing medium passing through the horticultural substrate conditioner 100. The rotational speed of the shaft 26 may be from about 1 rpm to about 250 rpm. The shaft 26 may rotate clockwise and/or anti-clockwise. The speed and direction of rotation of the shaft 26 may be adjustable manually or automatically. The speed of rotation may be adjustable depending on the type of growing medium being conditioned.

The shaft 26, and/or its outer shaft member 31, includes a plurality of tines 28. The tines 28 may be disposed on the outer surface of the shaft 26. Alternatively, at least some, or all, of the tines 28 may be designed to protrude through apertures 35 of the shaft 26. The apertures 35 may be aligned across from each other such that a single tine 28 may be arranged in two apertures 35, as is depicted in FIGS. 5A and 5B. At least some of the tines 28 may be attached to the inner portion of the shaft 26, inner portion of member 31, inner portion of the member 33, or a combination thereof.

The tines 28 may be attached to the shaft 26, member 31, member 33, or a combination thereof by fasteners named above, adhesive, or a combination thereof. As shown in FIG. 5, at least some of the tines 28 may include an anti-slip portion 47 arranged at a root of the tine 28, where the tine 28 meets the outer surface of the shaft 26. The anti-slip portion 47 may be a sleeve made from a material having greater surface roughness than the main body of the tines 28 are made from. For example, the anti-slip portion may be made from rubber or textures plastic material.

Each tine 28 may have a length of about 0.25 cm to 25 cm, 0.5 to 20 cm, 1 cm to 15 cm, or 2.5 to 10 cm. A diameter of one or more tines 28 may be about 0.01 to 1 cm, 0.02 to 0.8 cm, 0.05 to 0.5 cm, or 0.09 to 0.6 cm. At least some of the tines 28 may have different length and/or diameter than the remaining tines 28. For example, about 10, 20, 30, 40, or 50% of the tines 28 may have different length and/or diameter than the remaining tines 28. The shorter tines 28 and the longer tines 28 may be spaced in an alternating fashion. Similarly, the tines 28 with a smaller diameter and the tines 28 with the greater diameter may alternate regularly or be arranged irregularly.

Spacing between the tines 28 may be designed according to a specific application. The spacing may be regular, irregular, in a pattern. A distance between a first tine 28 and a second tine 28' may be about 0.5 to 20 cm, 1 to 15 cm, 2 to 10 cm, or 2.5 to 5 cm. The tines 28 may be mounted at about 15° to 180° angle, 300 to 120° angle, or 45° to 90° angle with respect to each other.

As FIG. 5C further illustrates, in at least one embodiment, in addition to tines 28, tines 51 may be added to at least some of the apertures 35, which are already housing tines 28, or which are otherwise empty. Tines 52 have a smaller diameter than tines 28. Tines 52 are also more flexible than tines 28 such that tines 51 bend easily in contact with the growing medium which is being conditioned. Tines 51 thus serve the purpose of finely combing through the already at least conditioned fibers to further separate individual fibers from each other while preserving the fibers' structure.

The term tines 28, 51 encompasses projections, spikes, teeth, pins, prongs, nails, needles, protrusions, extensions, bristles, or another elongate projection. At least some of, or all of, the tines 28 may be bendable, malleable, or flexible such that the tines 28 protrude through the growing medium fibers without tearing the individual fibers into undesirably sized pieces. The tines 28 may thus comb through the growing medium similar to a brush combing through hair, separating the fibers without causing a high degree of breakage. In at least one embodiment, a first portion of the tines 28 has less flexibility than a second portion of tines 28 such that the tines 28 provide a variety of force with which the growing medium is being broken down.

The tines 28 and/or 51 may be made from a variety of materials including wire, string, or cable made of plastic, fiberglass, rubber, another flexible material, or a combination thereof. Example plastic may include plastic materials named above or elastomers. For example, thermoplastic urethane, PVC, low-density polyethylene (LDPE), polyiso- prene, chloroprene, centroprene, neoprene. The material may be a plastic with a high portion of plasticizers.

Figure 9A:
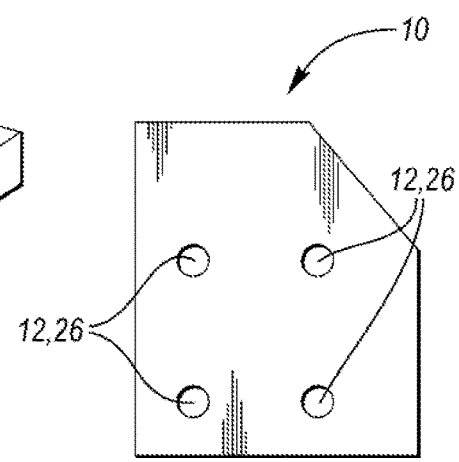
FIGS. 9A and 9B show example arrangements of a number of shafts within a single housing according to one or more embodiments.
Figure 9B:
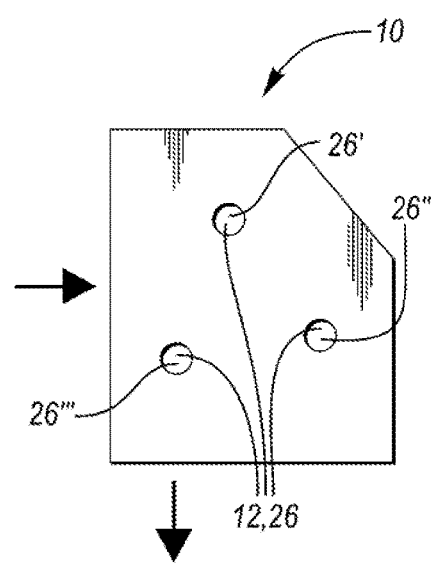

The housing 10 may include 2, 3, 4, 5, 6, or more rotatable shafts 26 of the same or different dimensions, all arranged within the housing cavity 9. The shafts 26 may be spaced apart from each other in a regular pattern or irregularly. For example, the shafts 26 may be arranged such that they form a square or triangular cavity between them, as is depicted in example embodiments of FIGS. 9A and 9B. Each shaft 26 may have the same or different dimensions, number of tines 28, dimensions of the tines 28, material the tines 28 are made from, a combination thereof, or the like. For example, in one embodiment, the housing 10 may have three shafts 26, a first shaft 26' different from the second and third shafts 26" and 26'" with respect to dimensions. The first shaft 26' may be located closest to the opening 39 where the growing medium enters the housing 10, having the greatest concentration of tines and having the tines 28 of greater dimensions than the remaining shafts 26" and 26'". The arrow in the Figures depicts direction of growing medium movement to, through, and out of the housing 10, starting at the opening 39 and exiting from the opening 41.

The beam 14 to which the housing 10 may be attached may be a shaft, bar, rod, or other elongate support structure. The beam 14 may be made of metal or other materials named herein. The beam 14 may be provided with a track or a rail (not depicted) to allow sliding movement of the housing 10 thereon. The beam 14 may further provide at least one attachment point for the apparatus 20. Apparatus 20 may be any mechanism allowing attachment of the housing 10 to a wall, beam, or another machine such as a hopper. Apparatus 20 may include one or more plate, tab, disc, bracket, nut, bolt, screw, washer, or the like. Apparatus 20 may include one or more portions such as additional brackets, rods, fasteners, a combination thereof, or the like. For example, in an example embodiment of FIG. 7, the apparatus 20 includes a set of brackets attached to the beam 14 with fasteners, each bracket including an aperture through which an elongate support member 16 protrudes, and a set of washers.

Figure 7:
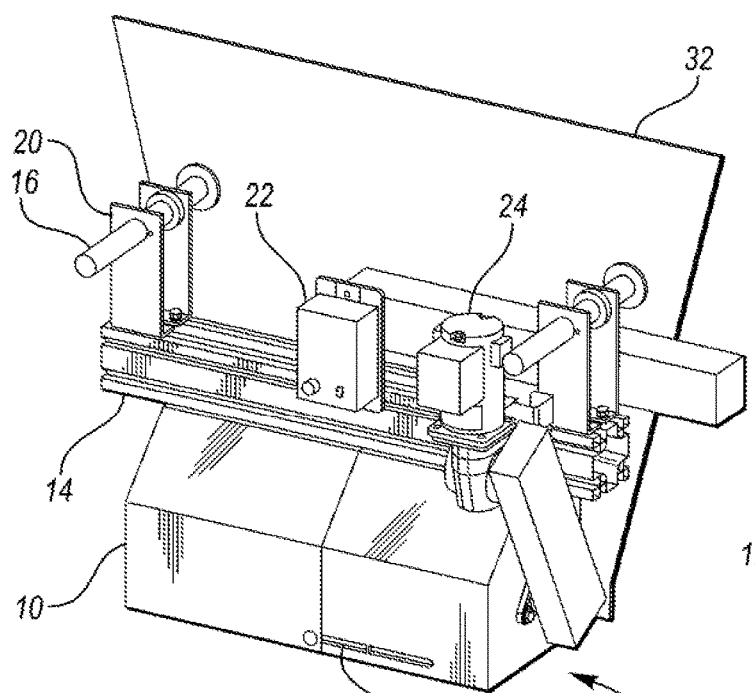
FIG. 7 shows a front perspective view of the conditioner depicted in FIG. 1 in configuration with an example hopper.
Figure 8:
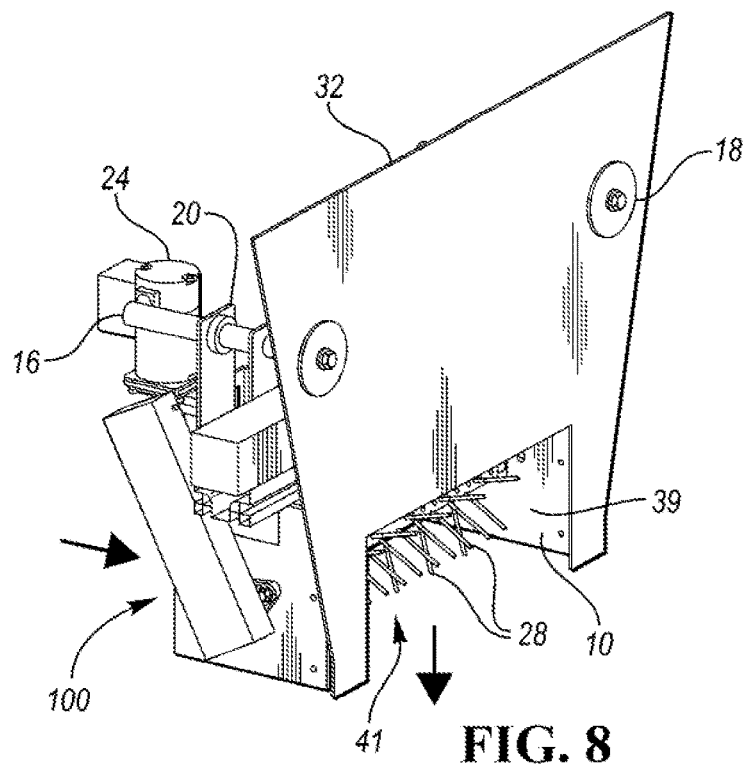
FIG. 8 shows an alternative view of the embodiment depicted in FIG. 7.

As is depicted in FIGS. 7 and 8, the horticultural substrate conditioner 100 may be attached, fastened, and/or removably coupled to a variety of objects such as a wall of a building, wall of a machine such as a hopper or another object dispensing the growing medium, to a mechanism connecting the conditioner 100 to a conveyor belt supplying the growing medium, or the like. The connection may be enabled via the beam 14, the apparatus 20, or by providing fasteners on the top panel 11, panels 13, side panels 31, one or more metal portions 17 of the rear panel, or a combination thereof. The fasteners may include nuts, bolts, screws, washers, adhesives, brackets, hooks, hangers, a combination thereof, or the like.

The horticultural substrate conditioner 100 may be motorized and/or automated. For example, the conditioner 100 may include a motor 24 or other electric actuator to automate direction and/or speed of shaft 26 rotation, adjustment of the housing 10 dimensions, adjustment of the shaft 26 length, a combination thereof, or the like. The conditioner 100 may include a controller 22 to adjust the direction and/or speed of shaft 26 rotation, adjustment of the housing 10 dimensions, adjustment of the shaft 26 length, a combination thereof, or the like. The motor 24, the controller 22, or both may be located on or adjacent to the beam 14, the housing 10, or both. The conditioner 100 may be powered by any source of energy such as a 120 V power outlet, solar power panels, a generator, or the like.

With respect to the materials, it is desirable to produce as many individual portions of the conditioner 100 from sustainable, lightweight, and/or economical materials. For example, the materials may include an elastomer, a thermoplastic, a thermoset resin. The thermoset resin may include a polyester resin, an epoxy resin, a phenolic resin, a polyurethane, a polyimide, a silicone, or other type of resins, and combination thereof. At least some of the portions, such as the housing 10, may be reinforced with a fibrous material such as fiber-reinforced polymers. For example, the housing 10 may be made from a composite reinforced with carbon fiber, aramid fiber, glass, basalt, the like, or a combination thereof.

As is depicted in FIG. 8, the wall of the building, hopper, or another object the conditioner 100 may be connected to may include an opening defining the entry port 39 by which the growing medium is being supplied to the conditioner 100. The dimensions of the entry port may differ, depending on the supply, volume, or amount of the incoming growing medium.

A method of conditioning the growing medium is also disclosed. In at least one embodiment, the method includes supplying growing medium having a first density and first size to the conditioner 100 having a plurality of tines 28 disposed upon a rotatable shaft 26. The method further includes supplying growing medium into the housing via an input entry or opening 39. The input opening 39 may be defined by the entire space of the rear panel leading to the housing cavity 9, by the rear panel defined by the top panel 11, side panels 31, an opening of the bottom portion of the housing, the material portions 17, 18, or a combination thereof. The method further includes engaging the fibrous growing medium with at least some of the tines 28 and breaking apart the fibrous growing medium by rotating the shaft 26, thereby lowering the first density of the fibrous growing medium to a second density which is lower than the first density and/or reducing the size of the growing medium chunks, clumps, and/or pieces from the first size to a second size as the growing medium proceeds through the conditioner 100.

The first size refers to the size of chunks, clumps, clusters, or pieces of the growing medium before the growing medium enters the conditioner. The first size may be about 6 inches wide×8 inches long, 5×7 inches, or 4×6 inches. The second size refers to a size of chunks, clumps, clusters or pieces of the growing medium after being conditioned in the conditioner 100. The second size may be about 3 inches wide×3.5 inches long, 2×2.5 inches, or 1×1.5 inches.

The method may include adjusting the speed and/or direction of rotation before, during, and/or after the conditioning process. For example, the method may include changing the speed of the shaft 26 rotation as the growing medium is advancing through the conditioner housing from the entry to the exit. The method may include sliding at least one panel 13 or its portion across at least one other panel 13 or its portion such that an opening 43 is formed. The method may include inputting additional components to the growing medium via the opening 43. Examples of such additional components include, but are not limited to, fertilizer(s), macronutrient(s), micronutrient(s), mineral(s), binder(s), natural gum(s), interlocking manmade fiber(s), and the like, and combinations thereof. The method may also include discharging the conditioned growing medium having the second density and/or second size via the exit 41, for example into a container (not depicted) disposed beneath and/or adjacent to the soil conditioner 100. The exit is located opposite to the top panel 11, defined by the aperture 21 or a cavity of the bottom panel.

The first density is a density of the growing medium prior to conditioning in the conditioner 100. The first density may be about 1-10% higher than the second density. The second density refers to a density of the growing medium after the conditioning process is finished and/or after the conditioned growing medium exits the conditioner 100.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A horticultural substrate conditioner comprising:
   a housing having an opening to receive a growing medium and an outlet to discharge the growing medium, the housing having a length, width and height dimensions, the opening spanning the length and height dimensions, and at least one of the dimensions of the housing is adjustable;
   a shaft arranged within the housing, the shaft rotatable relative to the housing; and
   a plurality of tines disposed on the shaft spaced apart from each other, the tines comprising a flexible material, the shaft being the only shaft having tines disposed between the opening and the outlet,
   wherein upon entry of a growing medium into the housing, the tines are arranged to separate the growing medium such that as the shaft rotates, the growing medium is broken apart and/or reduced in density and/or size to enable uniform distribution of the growing medium into a container upon discharge from the housing.

2. The conditioner of claim 1, further comprising a motor for rotating the shaft.

3. The conditioner of claim 1, wherein the shaft comprises a lightweight material such as polyvinyl chloride (PVC).

4. The conditioner of claim 1, wherein the flexible material is plastic wire or string.

5. The conditioner of claim 1, further comprising a mounting bracket for attaching the horticultural substrate conditioner onto a growing medium filler or hopper.

6. The conditioner of claim 1, wherein at least one dimension of the housing is adjustable.

7. The conditioner of claim 1, wherein a length of the shaft is adjustable.

8. The conditioner of claim 1, wherein the tines are spaced between about 1.25 cm and 2.5 cm apart from each other.

9. A substrate conditioner comprising:
 a housing having an opening to receive a medium and an outlet to discharge the ng medium, the housing having a length, width and height dimensions, the opening spanning the length and height dimensions, and at least one of the dimensions of the housing is adjustable;
 a shaft arranged within the housing, a length of the shaft being adjustable; and
 a plurality of flexible tines disposed on the shaft and including a first portion of the tines being less flexible than a second portion of the tines, each of the plurality of tines having dimensions of about 0.25 cm to 0.5 cm by about 20 cm to 25 cm,
 wherein each of the plurality of tines is spaced apart by about 1.25 cm to 2.5 cm.

10. The conditioner of claim 9, wherein the shaft has a diameter of about 2.5 cm.

11. The conditioner of claim 9, wherein the tines comprise a plastic material with a portion of plasticizers.

12. The conditioner of claim 9, wherein the tines are malleable.

13. The conditioner of claim 9, wherein the shaft includes perforations capable of housing the tines.

14. The conditioner of claim 9, wherein each tine comprises an anti-slip portion adjacent to the shaft.

15. The conditioner of claim 9, wherein the conditioner includes at least one additional shaft with tines.

16. A method of conditioning a fibrous growing medium to optimize filling conditions in a container, the method comprising:
 providing a horticultural substrate conditioner comprising a housing an opening, an outlet and a plurality of flexible projections disposed upon a rotatable shaft, the housing having a length, width and height dimensions, the opening spanning the length and height dimensions, and at least one of the dimensions of the housing is adjustable;
 supplying a fibrous growing medium having a first density and first size to the horticultural substrate conditioner;
 separating the fibrous growing medium with at least some of the plurality of flexible projections;
 breaking apart the fibrous growing medium by rotating the shaft, thereby lowering the first density and first size of the fibrous growing medium to create a conditioned growing medium having a second density and second size lower than the first density and first size, the first density being about 10% higher than the second density; and
 discharging the conditioned growing medium into the container disposed adjacent to the soil feeder substrate conditioner.

17. The method of claim 16, wherein the first size is about 10 cm wide and about 15 cm long.

18. The method of claim 16, wherein the second size is about 2.5 cm wide and about 4 inches long.

19. The method of claim 16, wherein the container is a tapered horticultural container.

* * * * *